United States Patent [19]

Lee

[11] Patent Number: 5,565,937
[45] Date of Patent: Oct. 15, 1996

[54] PAIR OF EYEGLASSES WITH ANGLE-ADJUSTABLE BOWS

[76] Inventor: Min-Young W. Lee, No. 473, Jong-Shan S. Rd., Yung-Kang City, Tainan Hsien, Taiwan

[21] Appl. No.: 536,444

[22] Filed: Sep. 29, 1995

[51] Int. Cl.$^6$ ................................................. G02C 5/14
[52] U.S. Cl. ................................................. 351/120
[58] Field of Search ................................. 351/120, 111, 351/140; 2/453

[56] References Cited

U.S. PATENT DOCUMENTS 5,457,505  10/1995  Canavan et al. ................. 351/120

*Primary Examiner*—William L. Sikes
*Assistant Examiner*—Huy Mai
*Attorney, Agent, or Firm*—Harness, Dickey & Pierce, P.L.C.

[57] ABSTRACT

A pair of eyeglasses includes a pair of bows, a lens frame and two connectors. The lens frame has two side portions, each of which has a positioning hole and a ring member with a central hole formed coaxially and integrally in the positioning hole. The ring member has a notch and an inner face which is provided with a first engagement device. Each of the connectors is connected to a respective one of the bows and includes an integral cylindrical connecting portion inserted rotatably into the central hole of a corresponding one of the ring members, and a second engagement device which passes through the notch of the corresponding one of the ring members and which engages the first engagement device of the corresponding one of the ring members so as to position the connecting portions of the connectors with respect to the positioning holes of the lens frame. The angles of vertical inclination of the bows can be adjusted with respect to the lens frame by rotating the connectors about their connecting portions in the positioning holes of the lens frame.

3 Claims, 4 Drawing Sheets

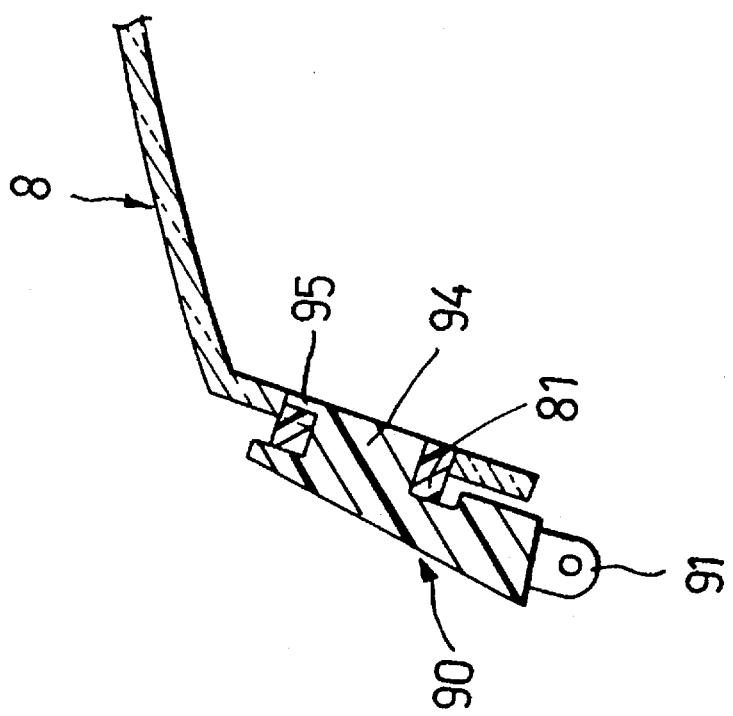

PAIR OF EYEGLASSES WITH ANGLE-ADJUSTABLE BOWS

BACKGROUND OF THE INVENTION

1. Field of the Invention

This invention relates to a pair of eyeglasses, more particularly to a pair of eyeglasses with a pair of angle-adjustable bows.

2. Description of the Related Art

Referring to FIG. 1, a conventional pair of eyeglasses is shown to comprise a lens frame 1, two connecting rings 2, a lens 3 mounted within the lens frame 1, two engagement members 4, a pair of bows 6, and two pivot members 7. The lens frame 1 has two side portions, each of which is provided with an oblong projection 11. Each of the oblong projections 11 has a central hole 111 formed therethrough and a blind hole 112. Two cavities 12 are formed in upper and lower sides of each one of the projections 11. Each of the connecting rings 2 has a central hole 21 into which a respective one of the projections 11 may be inserted, and two pins 22 which may be engaged within the respective cavities 12. The periphery of each of the connecting rings 2 is provided with teeth 23 and a radially, outwardly protrusion 24 formed adjacent to the lens 3 when the connecting rings 2 are mounted to the lens frame 1.

Each of the engagement members 4 has a rear end portion that is connected pivotally to a corresponding one of the bows 6 by means of a pivot pin 5, and a front end that is provided with a through bore 41. Each through bore 41 has an inner periphery which is provided with teeth 42 which are capable of meshing with the teeth 23 of a corresponding one of the ring members 2. Each of the engagement members 4 has a recess 43 which is adapted to receive a corresponding one of the protrusions 24 when the ring members 2 are engaged within the central bore 41 of the respective one of the engagement members 4. Each of the pivot members 7 has a circular head portion 70 which has a diameter that is greater than that of the central bore 41 and which has a pivot axle 71 extending therefrom. Each pivot axle 71 has an enlarged distal end 711 and an axial slit 712 extending inwardly from the distal end 711. Each head portion 70 further has an engaging pin 72 formed adjacent to the pivot axle 71. The distal ends 712 of the pivot axles 71 may pass through a corresponding one of the central bores 41, the central holes 21 of the connecting rings 2 and the central holes 111 of the projections 11 such that the fixing pins 72 are engaged in a corresponding one of the blind holes 112 in order to secure the engagement members 4 and the connecting rings 2 to the side portions of the lens frame 1. The angle of vertical inclination of the bows 6 relative to the lens frame 1 can be adjusted by rotating the bows 6 and by forcing the engagement members 4 to rotate relative to the connecting rings 2.

The drawback of the conventional eyeglasses is that the great number and the small size of the eyeglasses components result in an increased difficulty during the manufacture and assembly of the eyeglasses.

SUMMARY OF THE INVENTION

Therefore, the main objective of the present invention is to provide a pair of eyeglasses which can be easily manufactured and assembled.

According to the present invention, a pair of eyeglasses comprises a pair of bows, a lens frame and two connectors. The lens frame has two side portions, each of which has a generally circular horizontal positioning hole formed therethrough, and a ring member with a central hole formed coaxially and integrally in the positioning hole. The ring member has a notch and an inner face which is provided with a first engagement device. Each of the connectors is connected to a respective one of the bows and includes an integral cylindrical connecting portion inserted rotatably into the central hole of a corresponding one of the ring members, and a second engagement device which passes through the notch of the corresponding one of the ring members and which engages the first engagement device of the corresponding one of the ring members so as to position the connecting portions of the connectors with respect to the positioning holes of the lens frame in a first position. Each of the connecting portions is forcible to rotate by an angle with respect to the corresponding one of the ring members in order to position the connecting portions of the connectors with respect to the positioning holes of the lens frame in a second position. The angles of vertical inclination of the bows can be adjusted with respect to the lens frame by rotating the connectors about the connecting portions thereof in the positioning holes of the lens frame.

In a preferred embodiment of the present invention, each of the first engagement devices is formed as a plurality of teeth on a corresponding one of the inner faces of the ring members. Each of the second engagement devices includes a nose and a plurality of teeth which are formed on the nose and which mesh with the teeth on the corresponding one of the ring members.

In the preferred embodiment, the inner face of each of the ring members is formed within a respective one of the positioning holes and is spaced from the inner face of a respective one of the side portions by a predetermined distance. Each of the second engagement devices has a thickness which is substantially equal to the predetermined distance so that each of the second engagement devices can be flush with the inner face of the respective one of the side portions when the first and second engagement devices are engaged.

BRIEF DESCRIPTION OF THE DRAWINGS

Other features and advantages of this invention will become apparent in the following detailed description of the preferred embodiment of this invention with reference to the accompanying drawings, in which:

FIG. 4 is a fragmentary sectional view illustrating how the connector is connected to the lens frame of the eyeglasses according to the present invention.

DETAILED DESCRIPTION OF THE PREFERRED EMBODIMENT

Figure 1:
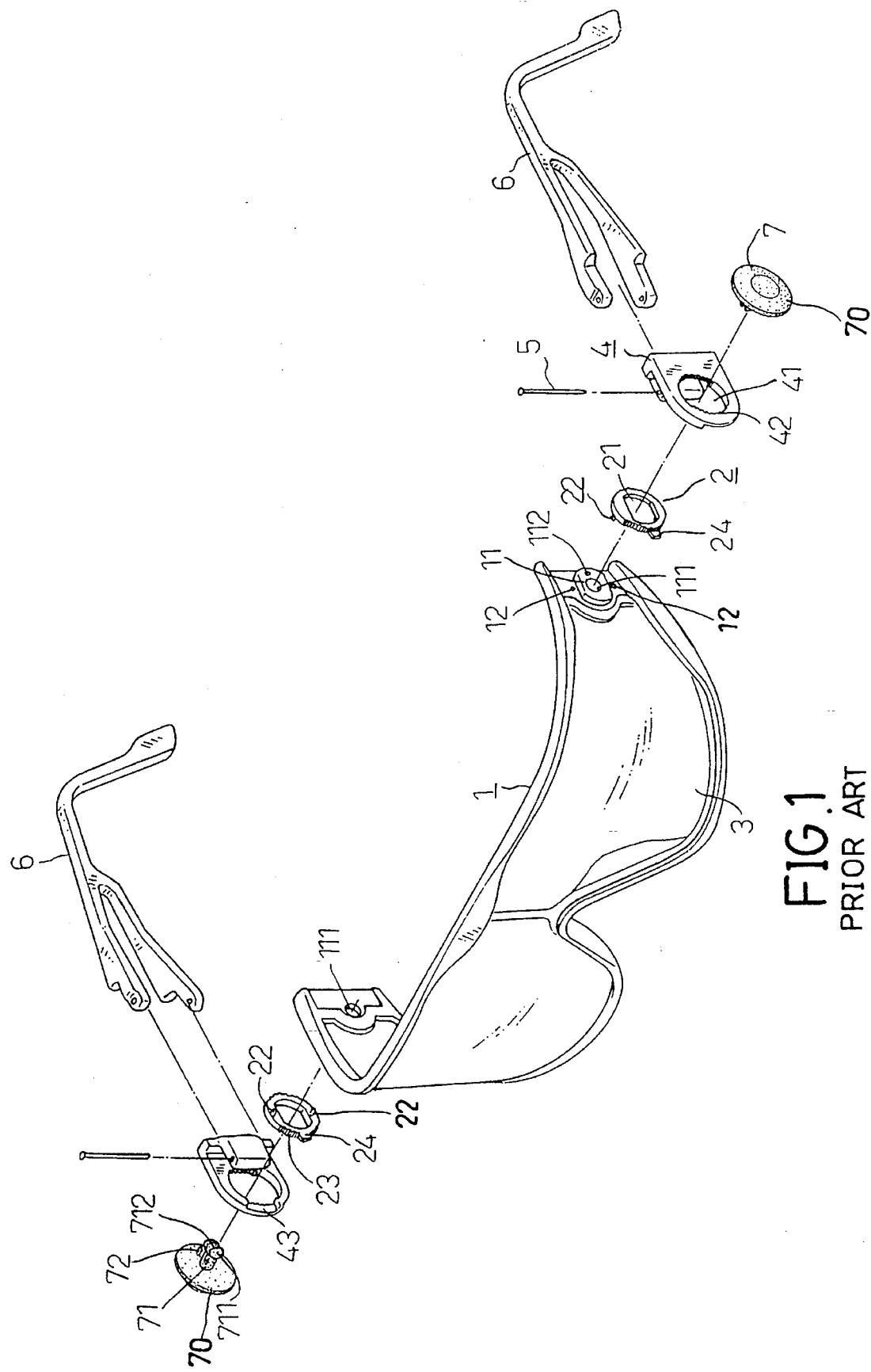
FIG. 1 is an exploded view of a conventional pair of eyeglasses.
Figure 2:
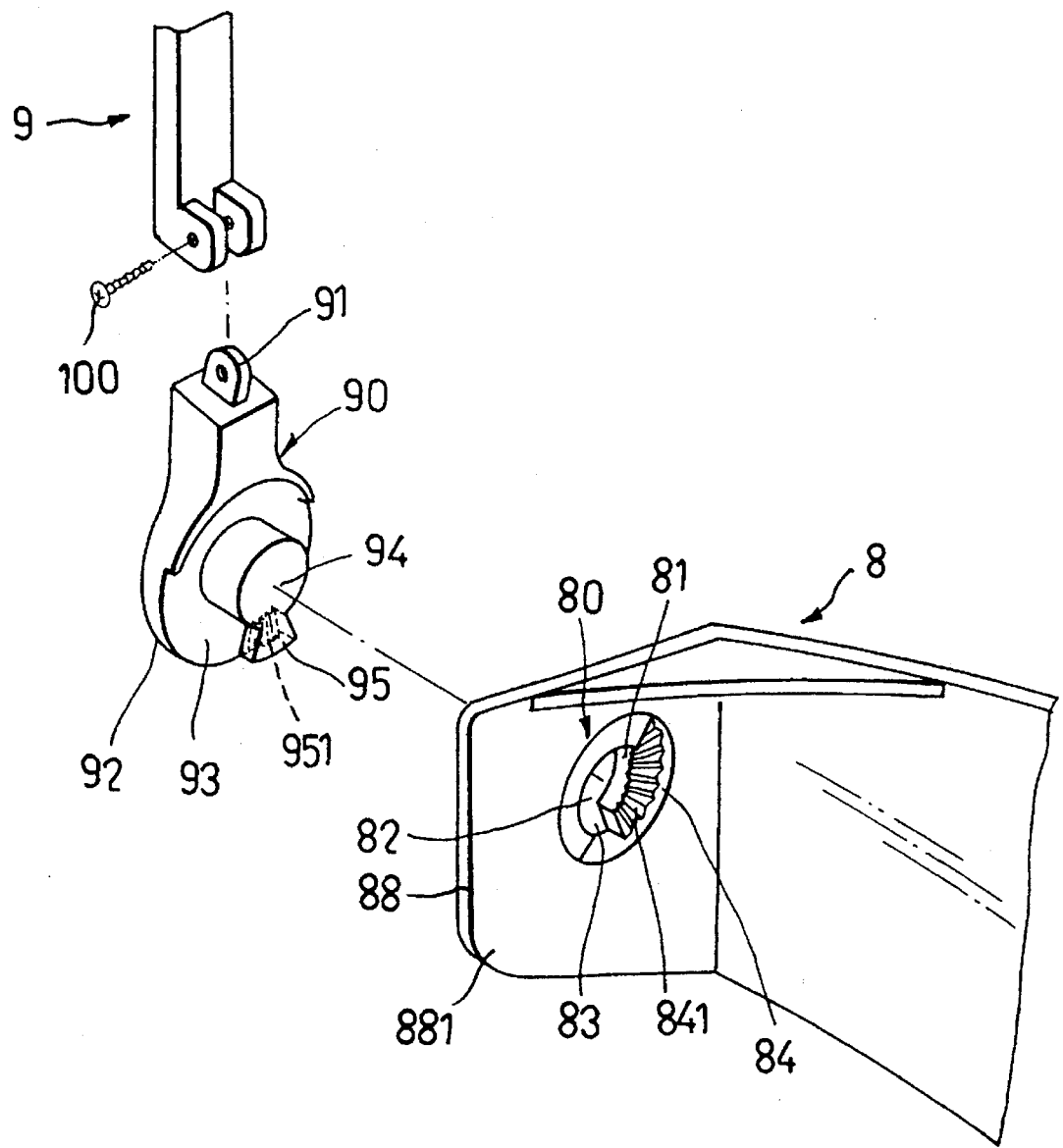
FIG. 2 is a fragmentary exploded view of a preferred embodiment of a pair of eyeglasses according to the present invention.
Figure 3:
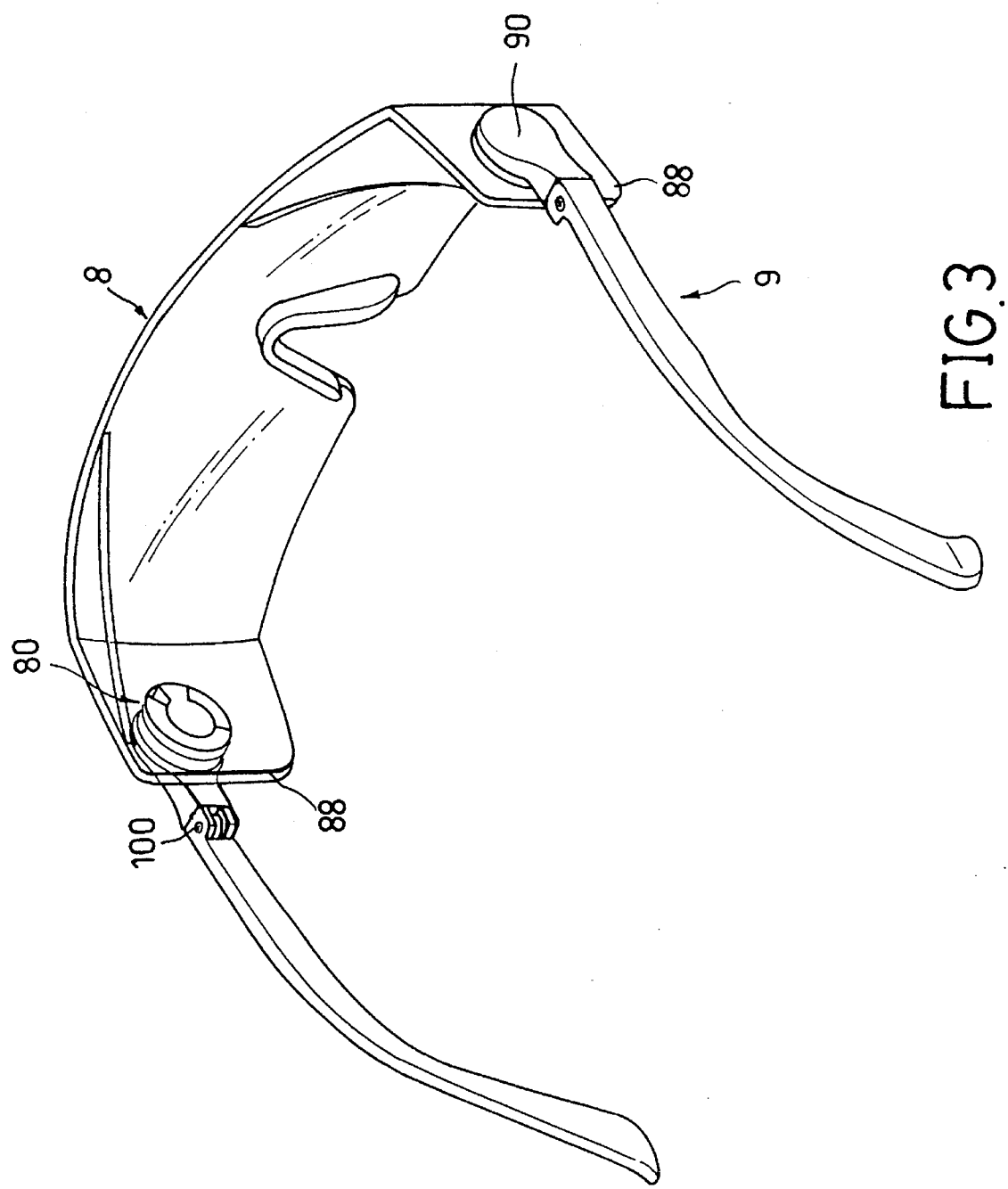
FIG. 3 is a rear perspective view of the eyeglasses according to the present invention.

Referring to FIGS. 2 and 3, a preferred embodiment of a pair of eyeglasses of the present invention is shown to comprise a pair of bows 9, a lens frame 8 and two connectors 90. The lens frame 8 has two side portions 88, each of which has a generally circular horizontal positioning hole 80 formed therethrough, and a ring member 81 formed coaxially and integrally in the positioning hole 80. The ring member 81 has a central hole 82, a sectorial notch 83 at its lower portion and a sectorial inner face 84 which is formed within a respective one of the positioning holes 80 and which is spaced from the inner face 881 of a respective one of the side portions 88 by a predetermined distance. Each inner face 84 is provided with a first engagement device which is formed as a plurality of teeth 841.

Each of the connectors 90 has a tongue 91 at one end thereof which is connected pivotally to a respective one of the bows 9 by means of a screw 100 in a conventional manner, and an integral cylindrical connecting portion 94 formed at the other end thereof. The other end of the connector 90 is formed as a circular disk 92 with a circular inner face 93 to which the connection portion 94 is connected coaxially and perpendicularly. Each connecting portion 94 further has a second engagement device which includes a sectorial nose 95 that extends generally perpendicularly from a distal end of the connecting portion 94 and a plurality of teeth 951 that are formed on an side face of the nose 95 and that face the circular inner face 93.

With reference to FIGS. 3 and 4, in assembly, each of the bows 9 is connected to a respective one of the connectors 90 as mentioned above. Each of the connecting portions 94 is then inserted into a corresponding one of the central holes 82 of the ring members 81 such that each of the noses 95 passes through a corresponding one of the notches 83 of the ring members 81. Each of the connectors 90 is rotated in order to allow the teeth 951 of the noses 95 to engage a corresponding one of the teeth 841 of the ring members 81, thereby positioning the connecting portions 94 of the connectors 90 with respect to the positioning holes 80 of the lens frame 8 in a first position, as best illustrated in FIG. 4. It is noted that the thickness of each of the noses 95 is substantially equal to the predetermined distance between the inner faces 881 and 84 so that the noses 95 can be flush with the inner face 881 of the respective one of the side portions 88 when the teeth 951 and 841 engage. Each connecting portion 94 is forcible to rotate by an angle with respect to a corresponding one of the ring members 81 in order to position the connecting portions 94 of the connectors 90 with respect to the positioning holes 80 of the lens frame 8 in a second position. The angles of vertical inclination of the bows 9 can be adjusted with respect to the lens frame 8 by rotating the connectors 90 about the connecting portions 94 thereof in the positioning holes 80 of the lens frame 8.

It is noted that the eyeglasses of the present invention is easy to assemble and has a simple structure to result in a higher manufacturing speed and a lower manufacturing cost. In addition, the bows 9 can have their angles of vertical inclination adjusted in a very convenient manner.

While the present invention has been described in connection with what is considered the most practical and preferred embodiment, it is understood that this invention is not limited to the disclosed embodiment but is intended to cover various arrangements included with the spirit and scope of the broadest interpretations and equivalent arrangements.

I claim:

1. A pair of eyeglasses, comprising:

a pair of bows;

a lens frame having two side portions, each of which has a generally circular horizontal positioning hole formed therethrough, and a ring member with a central hole formed coaxially and integrally in said positioning hole, said ring member having a notch and an inner face which is provided with a first engagement device;

two connectors, each of which is connected to a respective one of said bows and includes an integral cylindrical connecting portion inserted rotatably into said central hole of a corresponding one of said ring members, and a second engagement device which passes through said notches of the corresponding one of said ring members and which engages said first engagement device of the corresponding one of said ring members so as to position said connecting portions of said connectors with respect to said positioning holes of said lens frame in a first position, each of said connecting portions being forcible to rotate by an angle with respect to the corresponding one of said ring members in order to position said connecting portions of said connectors with respect to said positioning holes of said lens frame in a second position, whereby, angles of vertical inclination of said bows can be adjusted with respect to said lens frame by rotating said connectors about said connecting portions thereof in said positioning holes of said lens frame.

2. A pair of eyeglasses as claimed in claim 1, wherein each of said first engagement devices is formed as a plurality of teeth on said inner face of the corresponding one of said ring members, and each of said second engagement devices includes a nose and a plurality of teeth which are formed on said nose and which mesh with said teeth on the corresponding one of said ring members.

3. A pair of eyeglasses as claimed in claim 1, wherein said inner face of each of said ring members is formed within a respective one of said positioning holes and is spaced from an inner face of a respective one of said side portions by a predetermined distance, and each of said second engagement devices has a thickness which is substantially equal to said predetermined distance so that each of said second engagement devices can be flush with said inner face of the respective one of said side portions when said first and second engagement devices are engaged.

\* \* \* \* \*